US005611878A

United States Patent [19]

Miura et al.

[11] Patent Number: 5,611,878

[45] Date of Patent: Mar. 18, 1997

[54] METHOD OF MANUFACTURING MICROWAVE CIRCULATOR

[75] Inventors: Taro Miura, Tokyo; Makoto Kobayashi; Kazuaki Suzuki, both of Chiba, all of Japan

[73] Assignee: TDK Corporation, Tokyo, Japan

[21] Appl. No.: 407,855

[22] Filed: Mar. 21, 1995

[30] Foreign Application Priority Data

Apr. 1, 1994 [JP] Japan .................................... 6-085265

[51] Int. Cl.[6] .......................... B32B 31/12; B32B 31/26; H01P 1/387

[52] U.S. Cl. ............................. 156/89; 156/145; 264/61; 333/1.1; 333/24.1

[58] Field of Search ........................ 156/89, 145; 264/61, 264/59; 333/1.1, 24.1, 24.2

[56] References Cited

U.S. PATENT DOCUMENTS

| | | | |
|---|---|---|---|
| 4,618,912 | 10/1986 | Sakabe et al. . | |
| 5,068,629 | 11/1991 | Nishikawa et al. | 333/1.1 |
| 5,159,294 | 10/1992 | Ishikawa et al. . | |
| 5,450,045 | 9/1995 | Miura et al. | 333/1.1 |
| 5,459,439 | 10/1995 | Marusawa et al. | 264/61 X |
| 5,498,999 | 3/1996 | Marusawa et al. | 264/61 X |

FOREIGN PATENT DOCUMENTS

| | | |
|---|---|---|
| 5-299904 | 11/1993 | Japan . |
| 5-304404 | 11/1993 | Japan . |
| 6-6112 | 1/1994 | Japan . |
| 6-61708 | 3/1994 | Japan . |
| 6-164222 | 6/1994 | Japan . |
| 6-204723 | 7/1994 | Japan . |
| 6-291514 | 10/1994 | Japan . |
| 6-291515 | 10/1994 | Japan . |
| 6-343005 | 12/1994 | Japan . |
| 6-338707 | 12/1994 | Japan . |
| 2266412 | 10/1993 | United Kingdom . |
| 2269942 | 2/1994 | United Kingdom . |

OTHER PUBLICATIONS

"Characteristics of a Closed RF Magnetic Circuit Circulator—Miniaturization Compatible to Broadbanding", MIURA et al, The Institute of Electronics, Information and Communication Engineers—Technical Report of IEICE, MW94-14, (1994-05), pp. 17-23.

Patent Abstracts Of Japan, vol. 4, No. 130 (E-25) [612], Sep. 12, 1980, & JP-55 083301, Jun. 23, 1980.

"Beating the Beat", *Electronics De* 1984 *A* 1985: *Electronics Week*, vol. 42, No. 6, Mar. 17, 1969, pp. 203-204.

*Primary Examiner*—David A. Simmons
*Assistant Examiner*—M. Curtis Mayes
*Attorney, Agent, or Firm*—Nikaido, Marmelstein, Murray & Oram LLP

[57] ABSTRACT

A method of manufacturing a circulator includes the steps of forming, on at least one sheet (41, 42) of an insulating ferromagnetic material, dummy inner conductors (44*a*, 44*b*, 44*c*, 45*a*, 45*b*, 45*e*) made of a material which is thermally decomposed at a temperature equal to or less than a sintering completion temperature of the insulating ferromagnetic material, laminating a plurality of the sheets (40, 41, 42) of the insulating ferromagnetic material so that at least one insulating ferromagnetic material sheet (40, 41) covers the dummy inner conductors formed on the sheets (41, 42), firing the laminated insulating ferromagnetic material sheets (40, 41, 42) to form an insulating ferromagnetic material body (46) in a single continuous body and to form ducts (47) for inner conductors at portions occupied by the dummy inner conductors, injecting with pressure conductive paste into the ducts (47) in the insulating ferromagnetic material body (46), and firing the insulating ferromagnetic material body (46) to form the inner conductors (48) in the insulating ferromagnetic body (46).

8 Claims, 7 Drawing Sheets

METHOD OF MANUFACTURING MICROWAVE CIRCULATOR

FIELD OF THE INVENTION

The present invention relates to a method of manufacturing a circulator used in a microwave band radio device, for example in a mobile communication device such as a portable telephone.

DESCRIPTION OF THE RELATED ART

A conventional lumped element type circulator has an assembled circulator element with a circular plane shape and a basic structure as shown in an exploded oblique view of FIG. 1. In the figure, a reference numeral 10 denotes a circular substrate made of a non-magnetic material such as a glass-reinforced epoxy. Coil conductors (inner conductors) 11 and 12 are formed on top and bottom surfaces of the non-magnetic material substrate 10, respectively. These coil conductors 11 and 12 are electrically connected with each other by via holes 13 passing through the substrate 10. Circularly shaped members 14 and 15 made of a ferromagnetic material are attached to both surfaces of the non-magnetic material substrate 10 having the coil conductors 11 and 12 so that rotating RF (Radio Frequency) magnetic fluxes are induced in these ferromagnetic members 14 and 15 due to an RF power applied to the coil conductors 11 and 12. As aforementioned, the conventional circulator element in the circulator has a circular plane shape and is constructed by assembling, namely piling and bonding, the ferromagnetic members 14 and 15 on the both sides of the non-magnetic material substrate 10.

The circulator is then constructed, as shown in its exploded oblique view of FIG. 2, by stacking and fixing in sequence grounding conductor electrodes 16 and 17, exiting permanent magnets 18 and 19 and a metal housing separated to upper and lower parts 20 and 21 on the both ferromagnetic members 14 and 15, respectively. The housing parts 20 and 21 form a magnetic path of the magnetic flux from and to the exiting permanent magnets 18 and 19. Although not shown in FIG. 2, the circulator may have resonating capacitors for resonating its input frequency and terminal circuits for connecting the circulator with the external circuits. In the distributed element type circulator, the circulator element and the resonating capacitors may be formed in integral, and an impedance transducer for broadening the operating frequency of the circulator may be provided in the terminal circuits.

If an RF power is applied to the coil conductors 11 and 12 through the terminal circuits not shown, RF magnetic flux rotating around the coil conductors 11 and 12 will be produced In the ferromagnetic members 14 and 15. Under this state, if a dc magnetic field perpendicular to the RF magnetic flux is applied from the permanent magnets 18 and 19, the ferromagnetic members 14 and 15 present different permeability $\mu_+$ and $\mu_-$ depending upon rotating sense of the RF magnetic flux, as shown in FIG. 3. A circulator utilizes this difference of the permeability depending upon the rotating sense. Namely, a propagation velocity of the RF signal in the circulator element will differ in accordance with the rotating sense and thus the signals transmitting to the opposite directions will be canceled each other resulting that the propagation of the signal to a particular port is prevented. A non-propagating port is determined in accordance with its angle against a driving port due to the permeability $\mu_+$ and $\mu_-$ of the ferromagnetic member. For example, if ports A, B and C are arranged in this order along a certain rotating sense, the port B will be determined as the non-propagating port against the driving port A and the port C will be determined as the nonpropagating port against the driving port B.

The circulators have been broadly utilized as effective elements for preventing interference between amplifiers in a mobile communication device such as a portable telephone and also for protecting a power amplifier in the mobile communication device from a reflected power. With the spread of and downsizing of recent radio transmission devices, the circulators themselves are requested to be manufactured in lower cost and in smaller size and to operate with lower loss and in broader frequency band. In order to satisfy these requirements, it will be necessary to make a circulator having a large difference between the permeability $\mu_+$ and $\mu_-$ and having a driving circuit with small loss.

However, according to the conventional circulator shown in FIG. 1, since the driving lines 11 and 12 are formed on the non-magnetic material substrate 10 and these lines and substrate are put between the two separated ferromagnetic members 14 and 15, the magnetic path of the circulator is blocked by the non-magnetic material substrate 10. Thus, demagnetizing field will be produced at boundary faces between the non-magnetic material substrate 10 and the ferromagnetic members 14 and 15 causing the permeability to lower. As a result, the conventional circulator cannot sufficiently satisfy the aforementioned recent requirements.

In order to obtain a compact-sized circulator by reducing the demagnetizing field produced at the boundary faces of the substrate 10 against the ferromagnetic members 14 and 15, the applicant already proposed a circulator element manufactured by printing inner conductors of conductive material paste such as silver paste or palladium paste on ferromagnetic material green sheets, laminating these green sheets having the inner conductors, and firing the laminated green sheets so that the ferromagnetic material body closely surrounds the inner conductors to be formed in a single continuous layer (Japanese patent laid-open (unexamined) publication Nos. 6-338707 and 6-343005 which were published on Dec. 6, 1994 and Dec. 13, 1994, respectively and correspond to U.S. patent application Ser. No. 08/219,917, now U.S. Pat. No. 5,450,045 and to European patent application No. 94 400 682.4).

However, according to this related art proposed by the applicant, if a metal such as silver having a melting point lower than a sintering completion temperature of the ferromagnetic material is used for the inner conductor material, a part the conductive metal material will be vaporized during the firing process. Thus, the volume of the inner conductor will reduce causing poor characteristics of the circulator due to increasing of its loss or its breakage. On the other hand, if a metal such as palladium having a melting point higher than a sintering completion temperature of the ferromagnetic material is used for the inner conductor material, since the resistance of the inner conductor will become high, the insertion loss of the circulator will be extremely increased.

SUMMARY OF THE INVENTION

It is therefore an object of the present invention to provide a method of manufacturing a circulator, which can make a circulator in a smaller size.

Another object of the present invention is to provide a manufacturing method which can make a circulator in a lower cost.

Further object of the present invention is to provide a manufacturing method which can make a circulator capable of operating in a broader frequency range.

Still further object of the present invention is to provide a manufacturing method which can make a circulator capable of operating with lower loss.

According to the present invention, a method of manufacturing a circulator includes the steps of forming, on at least one sheet of an insulating ferromagnetic material, dummy inner conductors made of a material which is thermally decomposed at a temperature equal to or less than a sintering completion temperature of the insulating ferromagnetic material, laminating a plurality of sheets of insulating ferromagnetic material so that at least one insulating ferromagnetic material sheet covers the dummy inner conductors formed on the insulating ferromagnetic material sheet, firing the laminated insulating ferromagnetic material sheets to form an Insulating ferromagnetic material body in a single continuous body and to form ducts for inner conductors at portions occupied by the dummy inner conductors, injecting, with pressure, conductive paste into the ducts in the insulating ferromagnetic material body, and firing the insulating ferromagnetic material body to form the inner conductors in the insulating ferromagnetic body.

According to the present invention, the conductive metal material paste is injected at ambient temperature with pressure into the ducts prepared for the inner conductors after firing and sintering the ferromagnetic material body. Therefore, even if a metal such as silver, which has a melting point lower than a sintering completion temperature of the ferromagnetic material, is used for the inner conductors, the metal material will never be vaporized during the sintering process of the ferromagnetic material body. Thus, the volume of the inner conductor will not reduce preventing poor characteristics of the circulator due to increasing of its loss or its breakage from occurring. As a result, a circulator with low resistance inner conductors, and thus with low insertion loss can be provided.

Of course, since the insulating ferromagnetic material body for closely surrounding the inner conductors is sintered into a single continuous body, there is no discontinuous portion in this ferromagnetic material body. Thus, the RF magnetic flux will close in the circulator element resulting that no demagnetizing field will be produced and thus the difference between the permeability $\mu_+$ and $\mu_-$ will become large. As a result, broader operating frequency range and lower loss can be obtained with a smaller size circulator.

It is preferred that the method further includes a step of forming, on side surfaces of the insulating ferromagnetic material body, a plurality of terminal electrodes so as to be electrically connected to respective ends of the inner conductors, and a step of electrically connecting circuit elements to the terminal electrodes, respectively.

The connecting step may preferably include a step of electrically connecting resonating capacitors to the terminal electrodes, respectively.

It is preferred that the method further includes a step of attaching, on upper side and lower side of the insulating ferromagnetic body, excitation permanent magnets for applying a dc magnetic field to the insulating ferromagnetic material body, respectively. Also, the method further may include a step of closely fixing a metal housing having a continuous magnetic path to the excitation permanent magnets. Since the exciting magnetic path is continuous, a smaller magnetic resistance can be obtained causing its characteristics to extremely improve.

Preferably, the laminating step includes a step of laminating an upper ferromagnetic material layer, at least one intermediate ferromagnetic material layer and a lower ferromagnetic material layer in this order, and wherein the dummy inner conductors forming step includes a step of forming dummy inner conductors on top surfaces of the intermediate ferromagnetic material layer and the lower ferromagnetic material layer.

The method may further include a step of forming grounding conductors on a top surface of the upper ferromagnetic material layer and a bottom surface of the lower ferromagnetic material layer, respectively, and a step of forming conductors connecting the two grounding conductors with each other provided on a side surface of the insulating ferromagnetic material body.

Further objects and advantages of the present invention will be apparent from the following description of the preferred embodiments of the invention as illustrated in the accompanying drawings.

DESCRIPTION OF THE PREFERRED EMBODIMENTS

Figure 1:
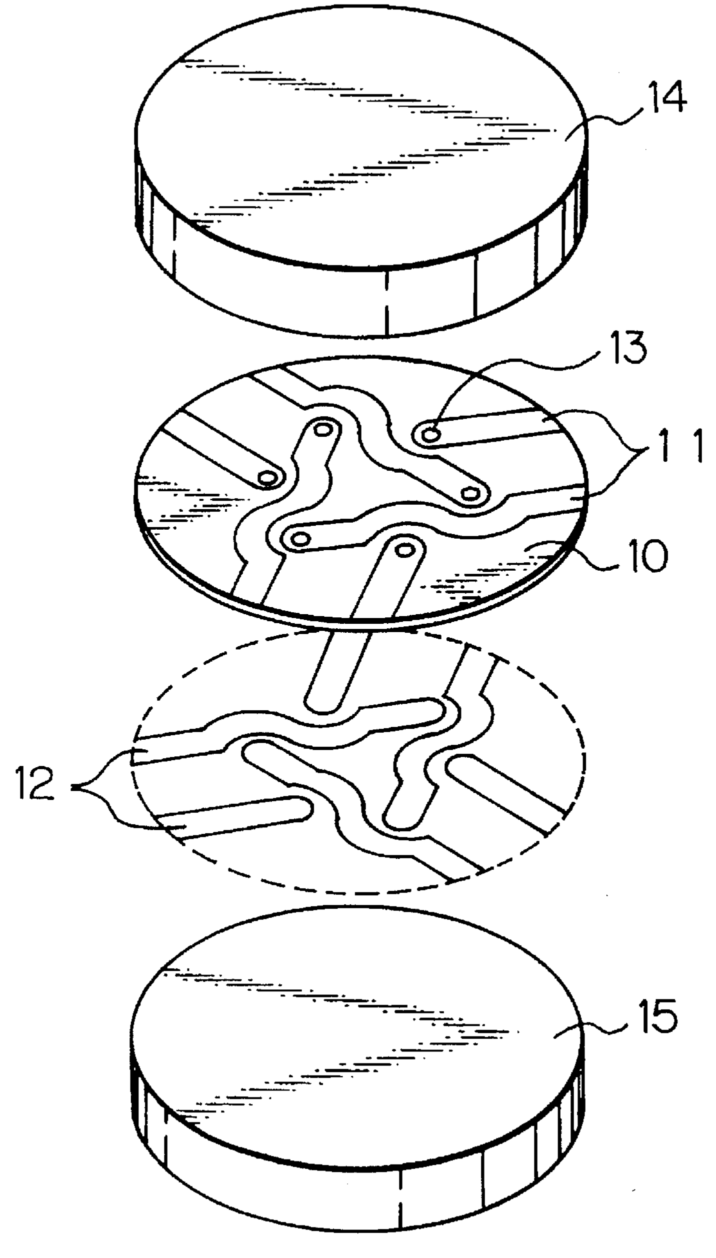
Fig. 1 PRIOR ART
FIG. 1 is an exploded oblique view showing the already described circulator element of the conventional lumped element type circulator.
Figure 2:
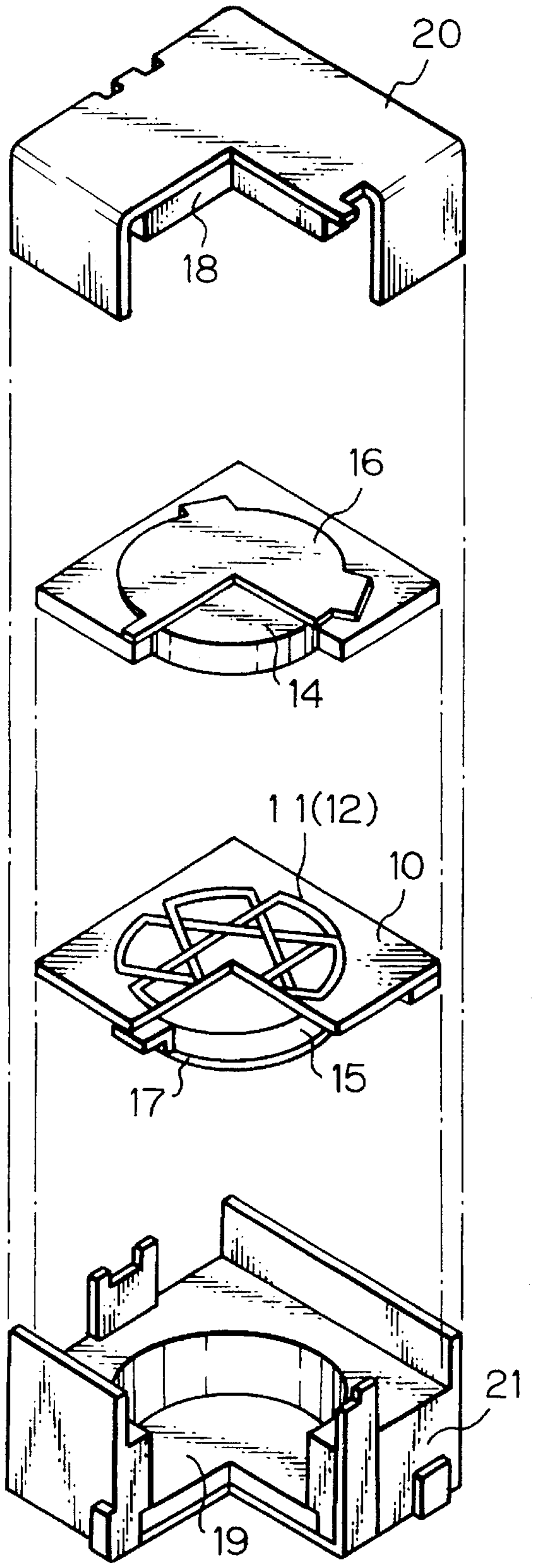
Fig. 2 PRIOR ART
FIG. 2 is an exploded oblique view illustrating the assemble of the already described conventional circulator.
Figure 3:
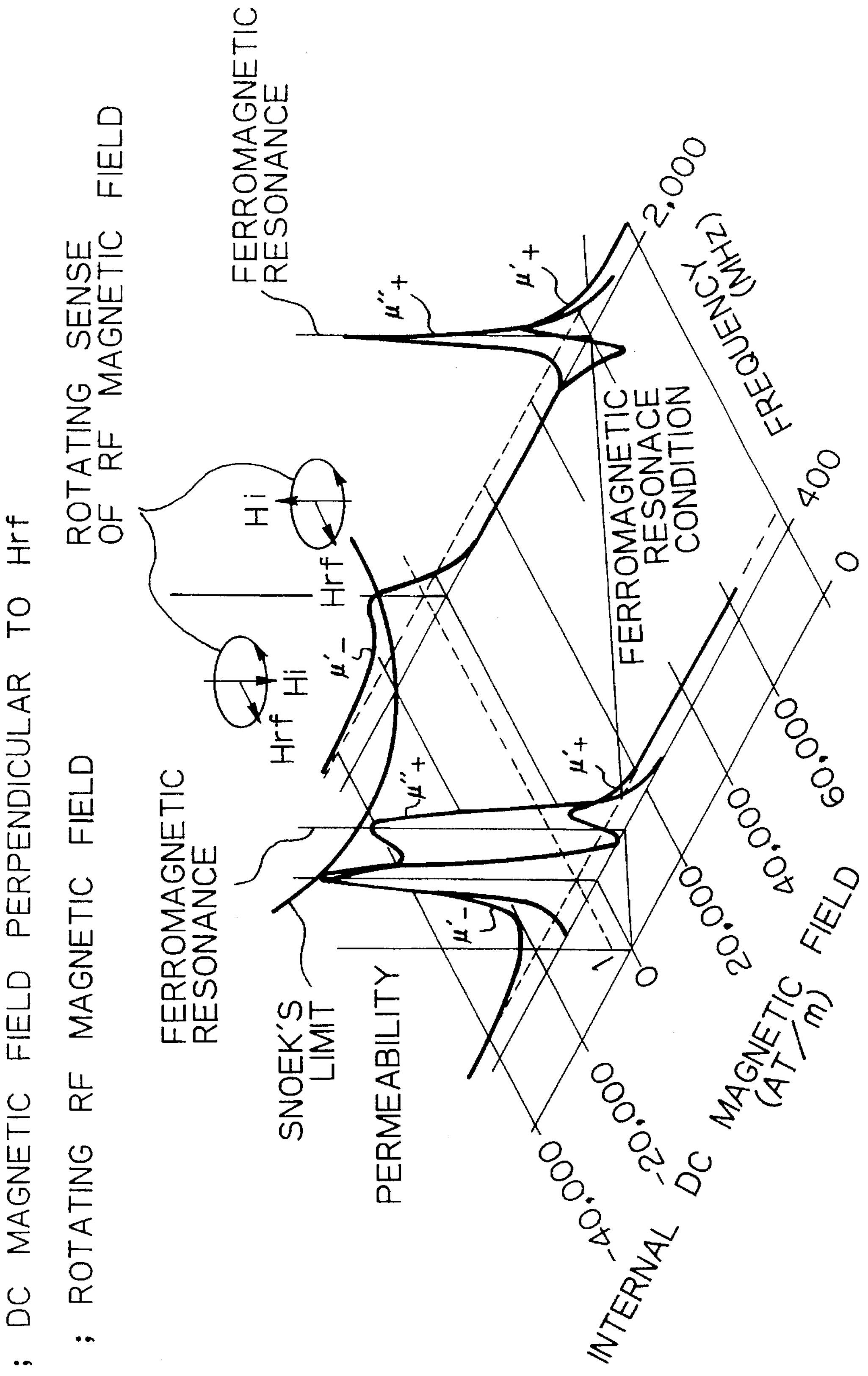
FIG. 3 shows a characteristics of gyromagnetic permeability of the ferromagnetic material.
Figure 4A:
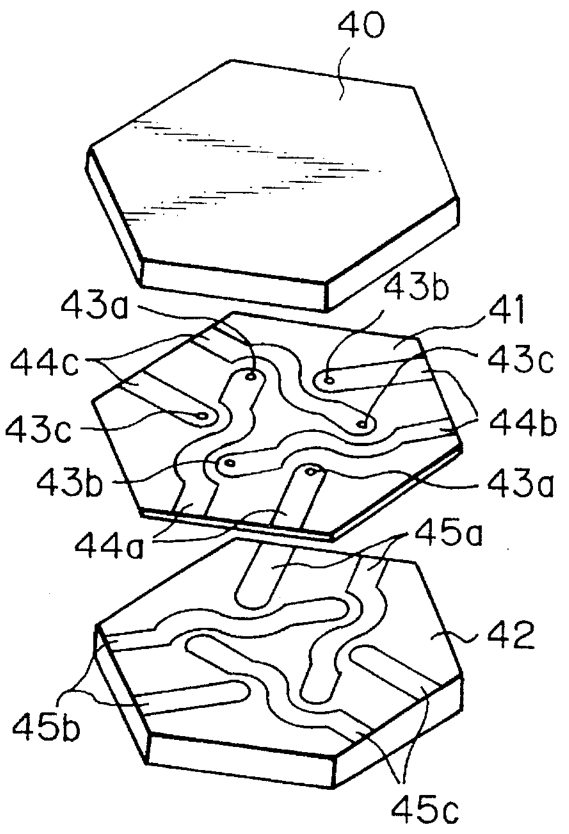
FIGS. 4*a* to 4*e* illustrate parts of manufacturing processes of a circulator element as a preferred embodiment according to the present invention, respectively.
Figure 4B:
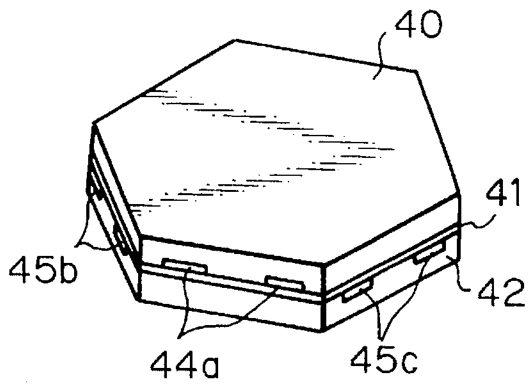
Figure 4C:
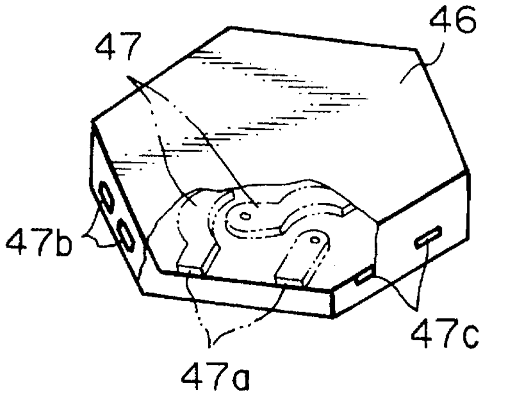
Figure 4D:
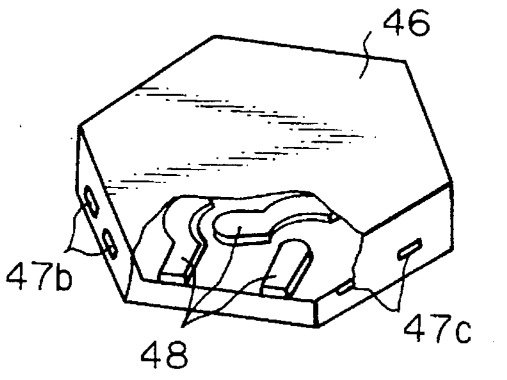
Figure 4E:
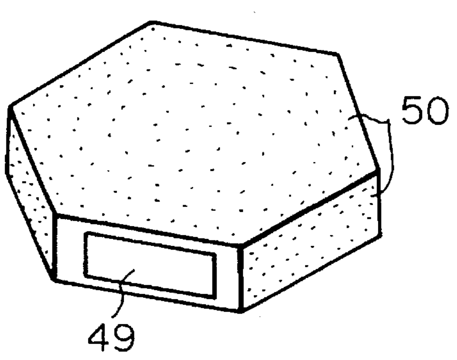
Figure 5:
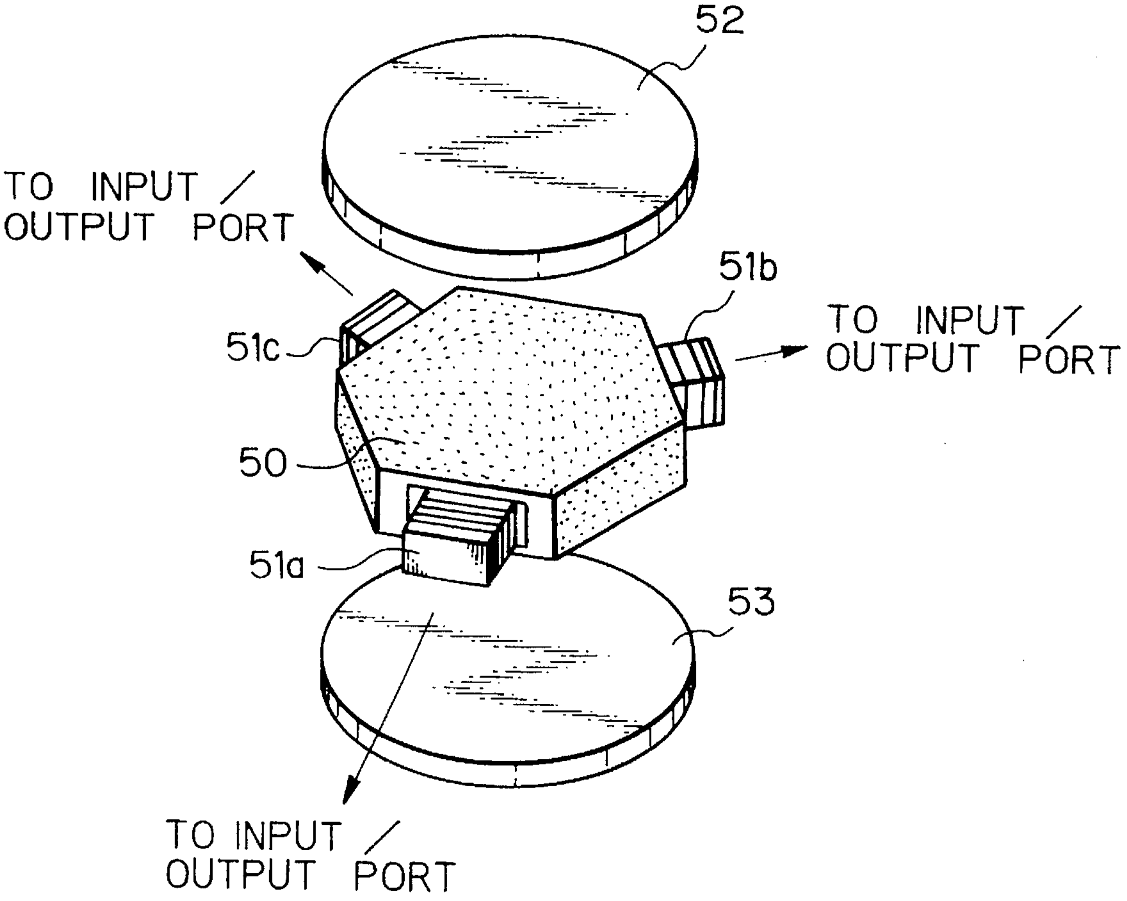
FIG. 5 is an exploded oblique view showing a circulator using the circulator element manufactured by the embodiment of FIGS. 4*a* to 4*e;*

FIGS. 4*a* to 4*e* schematically show parts of manufacturing processes of a circulator element of a three-port circulator as a preferred embodiment according to the present invention, and FIG. 5 shows the circulator element with permanent magnets and capacitors.

As shown in these figures, the circulator manufactured by this embodiment is a three-port circulator and its circulator element is formed with a plane shape of a regular hexagon. However, the plane shape of this element may be formed in any hexagonal shape or another polygonal shape so far as a symmetrical rotating magnetic field can be produced. Because of the polygonal plane shape of the circulator element, spaces for attaching discrete circuit elements such as resonating capacitors or termination resisters will remain on side surfaces of the circulator element. Therefore, if such the discrete circuit elements are additionally attached to the circulator element, a total size of the circulator can be maintained in small.

As shown in FIG. 4*a*, an upper ferromagnetic material sheet 40 having a thickness of about 1 mm, an intermediate ferromagnetic material sheet 41 having a thickness of about 160 μm and a lower ferromagnetic material sheet 42 having a thickness of about 1 mm are prepared. The upper and lower ferromagnetic material sheets 40 and 42 may be formed by laminating a plurality of green sheets with a thickness in general of 100 to 200 μm (preferably 160 μ). These ferromagnetic material sheets are made of the same insulating ferromagnetic material. This ferromagnetic material may be yttrium iron garnet (hereinafter called as YIG) and the ferromagnetic material sheets will be made of YIG, a binder and a solvent with the following ratio of components.

| | |
|---|---|
| YIG powder | 61.8 weight % |
| binder | 5.9 weight % |
| solvent | 32.3 weight % |

Via holes 43*a*, 43*b* and 43*c* passing through the intermediate sheet 41 are formed at predetermined positions of this sheet 41.

On top surfaces of the intermediate sheet 41 and the lower sheet 42, upper dummy inner conductors 44*a*, 44*b* and 44*c* made of carbon paste and lower dummy inner conductors 45*a*, 45*b* and 45*c* made of carbon paste are formed by printing or transferring them. These dummy inner conductors made of the carbon paste, used in order to form upper inner conductor ducts and lower inner conductor ducts by firing, may be made of any kind of paste such as acetic acid compound paste, or naphthalene or camphor paste which will be easily sublimated other than the carbon paste in condition that the paste can be thermally decomposed without expansion at a temperature less than a sintering completion temperature of the ferromagnetic material.

In this embodiment, these dummy inner conductors 44*a*, 44*b* and 44*c* (45*a*, 45*b* and 45*c*) are formed in three pairs of strip patterns. Each pair of strip patterns extends to the same radiating direction (a direction perpendicular to at least one side of the hexagon) by stepping aside from the via holes of another strip pattern. These dummy inner conductors may be formed in any optional patterns with a trigonally symmetric coil pattern for the three-port circulator. For example, these dummy inner conductors may be formed in a pattern with a single or a plurality of straight strip patterns, a pattern combining the straight strip patterns with the above-mentioned trigonally symmetric patterns or a pattern with no via hole.

Thus formed upper sheet 40, intermediate sheet 41 and lower sheet 42 are stacked in this order and then the stacked sheets are hot-pressed. And then, the hot-pressed sheets are diced and separated into discrete circulator elements as shown in FIG. 4*b*. Although FIG. 4*a* illustrates that each of sheets to be stacked has been already diced and separated to the respective circulator elements, these sheets are in practice diced and separated after stacking the sheets with the printed dummy inner conductors.

The circulator elements formed by separating the stacked sheets are then fired at a temperature of such as 1450° C. for example, which is equal to or higher than a sintering completion temperature of the YIG. This firing process may be carried out one time or more than one time. If a plurality of firing processes are carried out, at least one of the firing must be executed at a temperature equal to or higher than the sintering completion temperature of the YIG.

According to this firing, the ferromagnetic material layers constituting the upper sheet 40, intermediate sheet 41 and lower sheet 43 are integrally formed into a single continuous body 46 as shown in FIG. 4*c*. Simultaneously, the paste which has constituted the dummy inner conductors thermally decomposes and escapes in vapor so that ducts 47 for inner conductors are formed at the portions where the dummy inner conductors were occupied, within the ferromagnetic material body 46. On the side surfaces of the body 46, respective ends 47*a*, 47*b* and 47*c* of the ducts 47 are opened. Furthermore, the portions of the via holes 43*a*, 43*b* and 43*c* passing through the intermediate sheet 41 will remain as vacancies within the body 46.

In the aforementioned embodiment, firing is performed after the stacked sheets are diced and separated. However, this firing process can be effected before the dicing and separation process if the stacked sheets have an escape opening for passing vapor of the thermally decomposed paste.

In order to form inner conductors and via hole conductors in the ducts 47 and in the via hole vacancies 43*a*, 43*b* and 43*c* in the ferromagnetic body 46, respectively, according to the present invention, processes of injecting with pressure conductive paste into the ducts and the vacancies, and of firing the body will be executed as follows.

(1) First, pure silver powder, binder and solvent are combined to make conductive paste adjusted to have an appropriate viscosity. Then, the conductive paste is filled in an injection cylinder.

(2) Discharge ports of this injection cylinder are abutted to the ends 47*a*, 47*b* and 47*c* of the ducts 47 opened at the side surfaces of the body 46, and then the conductive paste is injected with pressure at ambient temperature through these openings so that the inner conductor ducts 47 and the via hole vacancies 43*a*, 43*b* and 43*c* are filled with the injected conductive paste.

(3) The ferromagnetic material body 46 after the injection of the conductive paste is heated at a temperature of about 150° C. so as to escape the solvent in the paste in vapor.

(4) Then, the body 47 is fired for about one hour at a temperature of about 900° C. so that the injected conductive paste is sintered.

By the above-mentioned injection and firing processes, upper inner conductors 48, lower inner conductors and via hole conductors are formed in the ferromagnetic body 46, and also one ends of the upper inner conductors 48 are electrically connected to one ends of the lower inner conductors through the via hole conductors, respectively.

Thus, the inner conductors with a trigonally symmetric coil pattern for the three-port circulator are formed in the ferromagnetic material body 16 so that propagation characteristics among the ports of the three-port circulator will be identical with each other.

Then, as shown in FIG. 4*e*, terminal electrodes 49 are formed by baking on every other side surfaces of the ferromagnetic material body 46, respectively, and grounding conductors 50 are formed on a top surface and a bottom surface and also on the remaining side surfaces of the body 46 by baking. As a result, the other ends of the upper inner conductors, which are appeared on the side surfaces of the body 46, are electrically connected to the terminal electrodes (49), respectively. Also, the other ends of the lower inner conductors, which are appeared on the side surfaces of the circulator element, are electrically connected to the grounding conductors (50). These terminal electrodes and the grounding conductors can be formed by printing the conductive paste and then by firing the printed paste simultaneously with the aforementioned firing of the injected conductive paste for the inner conductors.

The circulator element thus manufactured has a plane shape in a regular hexagon inscribed in a circle with 4 mm diameter and has a thickness of 1 mm. Resonating capacitors 51*a*, 51*b* and 51*c* may be mounted and soldered by a fellow soldering to the terminal electrodes (49) of the circulator element, respectively, as shown in FIG. 5. A circulator is then finished by assembling exciting permanent magnets 52 and 53 for applying a dc magnetic field and a metal housing operating also as a magnetic yoke, with the circulator element.

Figure 6A:
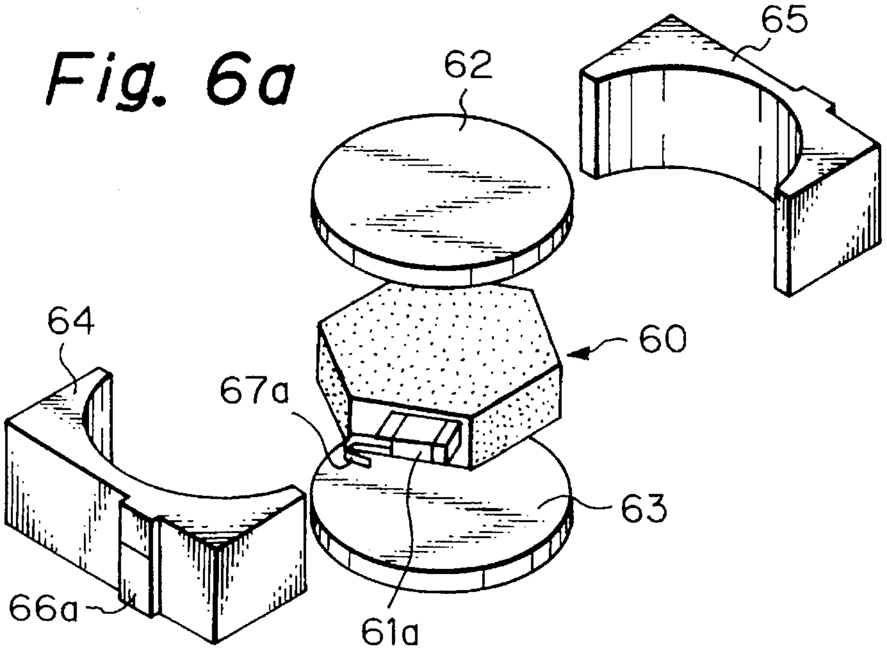
FIGS. 6*a*, 6*b* and 6*c* are exploded oblique views and an oblique view illustrating a structure of a housing and a structure of the circulator with the circulator element and exciting permanent magnets assembled in the housing.
Figure 6B:
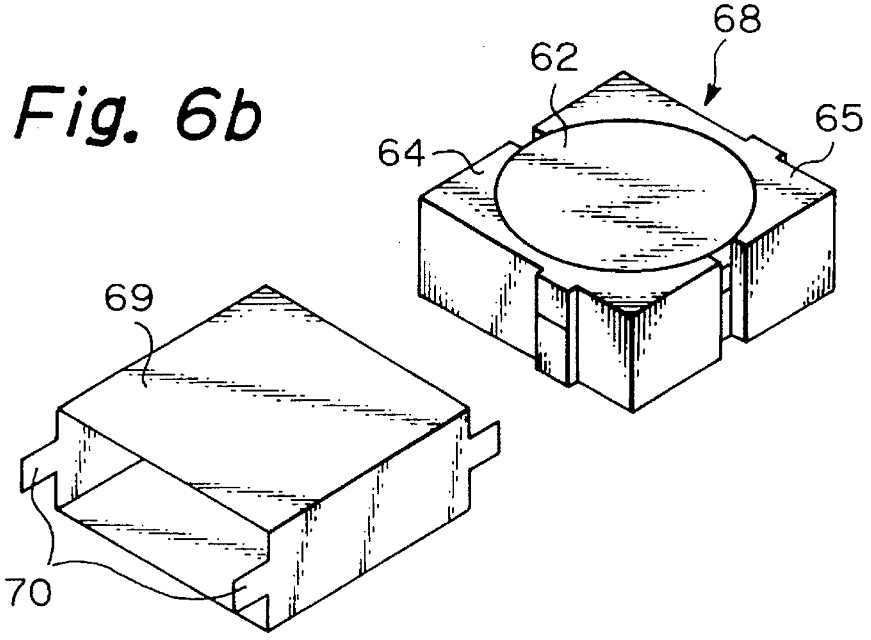
Figure 6C:
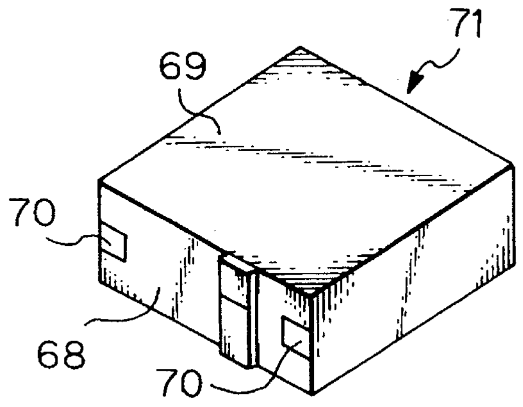

FIGS. 6*a*, 6*b* and 6*c* illustrate a structure of a housing and a structure of the circulator with the circulator element and exciting permanent magnets assembled in the housing. In assembling a circulator, as shown in FIG. 6*a*, the exciting permanent magnets 62 and 63 are stacked respectively on and under the circulator element 60 which has the resonating capacitors 61*a* attached to its side surfaces. Then, the stacked body of the circulator element 60 and the permanent magnets 62 and 63 are sandwiched and supported between support members 64 and 65 made of an insulating material as shown in FIG. 6*b*. At this time, elastic connection leads 67*a* with cream solder are mechanically caught between input/output terminals 66*a* formed in the insulating support members 64 and 65 and the resonating capacitors 61*a* attached to the circulator element 60 or terminal electrodes formed on the side surfaces of the circulator element 60, respectively. The connection lead 67*a* may be constituted by a U-turned elastic thin strip of copper for example. The insulating support member 64 (65) is formed by molding ceramic, glass reinforced epoxy or another plastic material capable of resisting to high temperature.

Then, as shown in FIGS. 6*b* and 6*c*, the assembly 68 constituted by the stacked body and the insulating support members 64 and 65 is closely inserted into a metal housing 69 and fixed in the housing 69 by bending projected tongue portions 70. Thus, the metal housing 69 and the permanent magnets 62 and 63 are closely contacted with each other. The metal housing 69 is made of a metal capable of operating as a magnetic yoke and the surface of the housing is plated by nickel or chromium. The metal housing 69 itself has substantially a square drum shape with integrally surrounding four faces and opened two opposite faces.

The assembly 68 thus fixed in the housing 69 will be passed through a reflow soldering oven and soldered so that the connection leads 67*a* are electrically connected to the input/output terminals 66*a* and to the resonating capacitors 61*a* or the terminal electrodes, respectively. FIG. 6*c* shows the finished circulator 71.

Operating frequency range and loss of the circulator is mainly determined by the performance of its circulator element. Larger difference between the permeability $\mu_+$ and $\mu_-$ and also lower coil resistance and lower magnetic loss tangent will result broader operating frequency range and lower loss of the circulator element. The circulator according to this embodiment using the inner conductor pressure-injection method can obtain following advantages.

(1) Since the ferromagnetic material layers are sintered into a single continuous body, the RF magnetic flux will close in the circulator element. Therefore, no demagnetizing field will be produced and thus the difference between the permeability $\mu_+$ and $\mu_-$ will become large. As a result, higher inductance can be obtained causing the circulator to downsize. The external dimension of the circulator shown in FIG. 6*c* is 5.5 mm×5.5 mm×3 mm while that of the conventional circulator is 7 mm×7 mm×3 mm. Thus, the circulator according to the present invention is extremely downsized.

(2) Since the ferromagnetic material layers are sintered into a single continuous body, the RF magnetic flux will close in the circulator element. Therefore, no demagnetizing field will occur and thus the difference between the permeability $\mu_+$and $\mu_-$ will become larger resulting broader operating frequency range.

(3) The inner conductors are made of fired metal with low resistance resulting lower loss.

(4) Since the structure of the circulator element is proper for mass production, a significant reduction in the manufacturing cost can be expected.

(5) Since the magnetic yoke constituted by the metal housing is united without separation and has a continuous magnetic path and also the magnetic yoke is closely contacted to the exciting permanent magnets, the exciting magnetic path is continuous without break. Thus, the magnetic resistance in the magnetic path will become extremely lower resulting excellent characteristics of the circulator.

Figure 7:
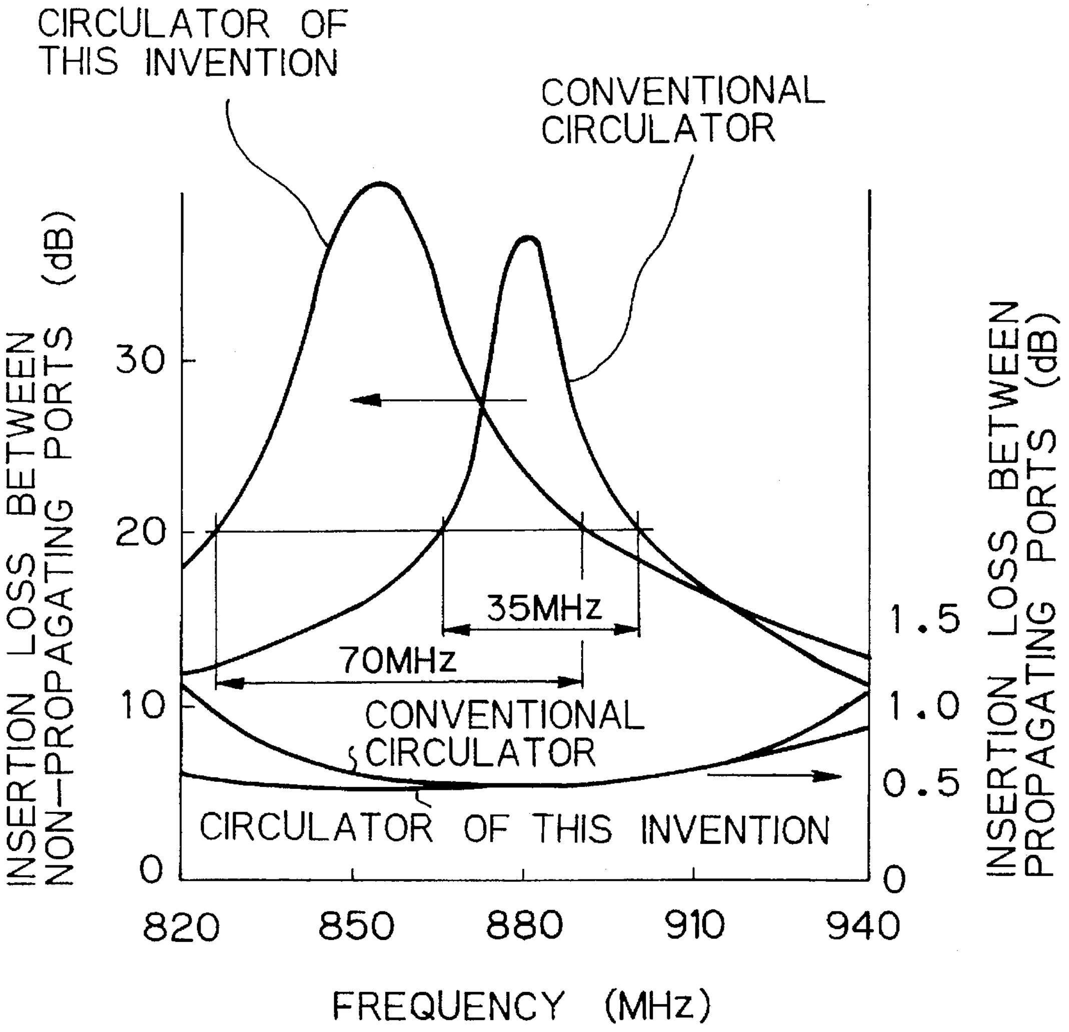
FIG. 7 illustrates insertion loss characteristics of the circulator manufactured by the embodiment of FIGS. 4*a* to 4*e* and the conventional circulator.

FIG. 7 illustrates insertion loss characteristics of the circulator manufactured by the embodiment shown in FIGS. 4*a* to 4*e* and the conventional circulator having the same size as that of the former one. In the figure, the axis of abscissa indicates frequency and the axis of ordinate indicates an insertion loss between non-propagating ports and an insertion loss between propagating ports. It is apparent from this figure that the circulator according to the embodiment of FIGS. 4*a* to 4*e* (the inner conductor pressure-injection method is used) has lower center operating frequency and lower loss than the conventional circulator.

Although, the ferromagnetic material is made of YIG in the aforementioned embodiments, any insulating ferromagnetic material other than YIG may be used in condition that no solid solution will occur with the inner conductor material.

The above-mentioned embodiment is described with respect to a three-port circulator. However, it will be apparent that the present invention can be applied to a circulator having ports more than three. Also the present invention can be applied to a distributed element circulator having a circulator element integral with a capacitor circuit and having an impedance transformer for broadening the operating frequency band combined in its terminal circuits, other than the lumped element circulator. Furthermore, it is apparent that a nonreciprocal circuit element such as an isolator can be easily formed from any of circulators according to the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a circulator, said method comprising the steps of:

forming, on at least one sheet of an insulating ferromagnetic material, dummy inner conductors made of a material which is thermally decomposed at a temperature equal to or less than a sintering completion temperature of said insulating ferromagnetic material;

laminating a plurality of the sheets of the insulating ferromagnetic material so that at least one insulating ferromagnetic material sheet covers said dummy inner conductors formed on said insulating ferromagnetic material sheet;

firing the laminated insulating ferromagnetic material sheets to form an insulating ferromagnetic material body in a single continuous body and to form ducts for inner conductors at portions occupied by said dummy inner conductors;

injecting, with pressure, conductive paste at ambient temperature into said ducts in the insulating ferromagnetic material body; and firing said insulating ferromagnetic material body to form the inner conductors in the insulating ferromagnetic body.

2. The method as claimed in claim 1, wherein said method further comprises a step of forming, on side surfaces of said insulating ferromagnetic material body, a plurality of terminal electrodes so as to be electrically connected to respective ends of said inner conductors, and a step of electrically connecting circuit elements to said terminal electrodes, respectively.

3. The method as claimed in claim 2, wherein said connecting step includes a step of electrically connecting resonating capacitors to said terminal electrodes, respectively.

4. The method as claimed in claim 2, wherein said method further comprises a step of attaching, on upper side and lower side of said insulating ferromagnetic body, excitation permanent magnets for applying a dc magnetic field to said insulating ferromagnetic material body, respectively.

5. The method as claimed in claim 4, wherein said method further comprises a step of closely fixing a metal housing having a continuous magnetic path to said excitation permanent magnets.

6. The method as claimed in claim 1, wherein said laminating step includes a step of laminating an upper ferromagnetic material layer, at least one intermediate ferromagnetic material layer and a lower ferromagnetic material layer in this order, and wherein said dummy inner conductors forming step includes a step of forming dummy inner conductors on top surfaces of said intermediate ferromagnetic material layer and said lower ferromagnetic material layer.

7. The method as claimed in claim 6, wherein said method further comprises a step of forming grounding conductors on a top surface of said upper ferromagnetic material layer and a bottom surface of said lower ferromagnetic material layer, respectively, and a step of forming conductors connecting the two grounding conductors with each other provided on a side surface of said insulating ferromagnetic material body.

8. A method of manufacturing a circulator, said method comprising the steps of:

forming, on intermediate and lower sheets of an insulating ferromagnetic material, dummy inner conductors made of a material which is thermally decomposed at a temperature equal to or less than a sintering completion temperature of said insulating ferromagnetic material, said dummy inner conductors formed on the respective intermediate and lower sheets having trigonally symmetric patterns, said intermediate sheet having a plurality of via holes;

laminating said lower and intermediate sheets of the insulating ferromagnetic material and an upper sheet of an insulating ferromagnetic material so that said upper sheet covers said dummy inner conductors formed on said intermediate sheet and that said intermediate sheet covers said dummy inner conductors formed on said lower sheet;

firing the laminated sheets to form an insulating ferromagnetic material body in a single continuous body and to form ducts for inner conductors at portions occupied by said dummy inner conductors, said ducts formed on said intermediate sheet being communicated to said ducts formed on said lower sheet through said via holes;

injecting, with pressure, conductive paste into said ducts and said via holes in the insulating ferromagnetic material body, said injection being performed at ambient temperature; and firing said insulating ferromagnetic material body to form the inner conductors and via hole conductors in the insulating ferromagnetic body.

* * * * *